United States Patent [19]
Jones

[11] 4,182,442
[45] Jan. 8, 1980

[54] BRICK HANDLING AND FORMING VOIDS IN LAYERS OF BRICKS

[76] Inventor: Robert E. Jones, 15 S. Oak Forest Dr., Asheville, N.C. 28803

[21] Appl. No.: 311,070

[22] Filed: Dec. 1, 1972

Related U.S. Application Data

[63] Continuation-in-part of Ser. No. 153,577, Jun. 16, 1971, Pat. No. 3,738,514.

[51] Int. Cl.² .............................................. B65G 57/00
[52] U.S. Cl. .................................. 198/422; 198/434; 198/486; 294/63 A; 414/61
[58] Field of Search ................ 294/62, 63 R, 63 A, 294/63 B, 87 R; 214/6 A, 1 BB, 8.5 C; 198/35, 422, 434, 486; 53/159

[56] References Cited
U.S. PATENT DOCUMENTS

| | | | |
|---|---|---|---|
| 870,450 | 11/1907 | Mayer | 294/62 |
| 1,900,243 | 3/1933 | Layer | 214/6 A |
| 2,933,207 | 4/1960 | Edmonds et al. | 198/422 X |
| 3,140,771 | 7/1964 | Harrison et al. | 198/349 X |
| 3,404,788 | 10/1968 | Thomas | 214/6 A |
| 3,487,959 | 1/1970 | Pearne et al. | 214/6 A |
| 3,491,901 | 1/1970 | Pearne et al. | 214/6 A |
| 3,731,785 | 5/1973 | Stuart | 198/35 |
| 3,738,514 | 6/1973 | Jones | 198/24 X |

Primary Examiner—Bruce H. Stoner, Jr.
Attorney, Agent, or Firm—William E. Mouzavires

[57] ABSTRACT

Method and apparatus wherein bricks are taken from a kiln car in two or more groups of multilayered bricks, and then moved to a shuttle station alongside a horizontal tray conveyor for loading the bricks thereon. At the discharge end of the tray conveyor, the bricks are discharged onto an elevator to further stack the bricks into a predetermined number of layers after which the bricks are conveyed to a strapping station where a pack of bricks is strapped into a discrete unit. Between the loading and discharge ends of the tray conveyor, certain layers of the brick have spaced rows of brick removed therefrom to form voids in the layer which eventually will constitute the third layer in the ultimate standard brick pack to be formed; the voids being applied to receive the tines of a forklift. In one embodiment where the group of bricks loaded on the trays of the horizontal conveyor include two layers of bricks, the entire top layer of bricks is removed and held temporarily above the horizontal conveyor at a station downpath from the point of removal, after which certain rows of brick are removed from the bottom layer and a support board is placed over the bottom layer after which the top layer is restored on the bottom layer. The brick removed from the bottom layer to form the voids are accumulated and when a predetermined number of bricks are accumulated, they are loaded back onto one of the trays of the conveyor.

48 Claims, 29 Drawing Figures

BRICK HANDLING AND FORMING VOIDS IN LAYERS OF BRICKS

RELATED APPLICATION

This application is a continuation-in-part of my copending U.S. patent application Ser. No. 153,577, filed June 16, 1971, now U.S. Pat. No. 3,738,514 issued June 12, 1973.

BACKGROUND OF INVENTION

In industry today, bricks are shipped from the point of manufacture to the point of retail and from the latter to the point of use, in standard brick packs containing ten layers of brick with each layer including eleven rows of brick with each row including five bricks. These packs are tied together usually by steel strapping. Additionally, in many instances, these brick packs have voids formed in the third layer from the bottom of accommodating the tines of a forklift to facilitate handling during loading and unloading in shipment or otherwise. Automatic and semiautomatic apparatus have been developed for stacking bricks to form a standard brick pack. The present invention is concerned with method and apparatus for handling brick to form a stack of bricks of predetermined size such as said standard brick pack, and more specifically, the invention is concerned with forming voids in certain layers of the bricks prior to stacking to form the predetermined stack wherein the voids will function to receive the tines of a forklift to facilitate handling of the stack. Additionally, the present invention is concerned with handling bracks such as from a point of supply on a kiln car to facilitate rapid and efficient loading of predetermined groups of bricks onto a horizontal tray conveyor utilized in forming brick stacks.

OBJECTS OF INVENTION

It is an object of the present invention to provide a novel method and apparatus for handling bricks or similar articles to form predetermined stacks of bricks. More specifically included herein is the provision of such method and apparatus employed for forming predetermined stacks of bricks which contain a plurality of voids for accommodating the tines of a forklift or similar apparatus.

A further object of the present invention is to provide novel method and apparatus for forming voids in brick layers to be included in a stack of bricks. Also included herein is the provision of such a method and apparatus for forming said voids which method and apparatus may be employed in conjunction with the brick discharge method and apparatus disclosed in my copending U.S. patent application, Ser. No. 153,577 identified above.

Another object of the present invention is to provide apparatus for gripping brick to form voids in certain layers of a multilayered group of bricks. Included herein is the provision of such apparatus which may be employed in conjunction with a horizontally movable conveyor to form voids in certain layers of bricks prior to discharge from the conveyor for further stacking.

A further object of the present invention is to provide novel method and apparatus for facilitating the loading of a predetermined group of bricks onto a horizontally movable conveyor. Included herein is the provision of such method and apparatus for enabling relatively high speed loading of bricks, with minimum damage, onto the trays of a horizontal conveyor. Further included herein is the provision of such method and apparatus which may be employed in conjunction with bricks stacked in conventional or other arrangements on a kiln car and removed from the stacks through the use of conventional overhead "dehacking" apparatus.

SUMMARY OF INVENTION

The above and other objects are achieved by a method and apparatus which will be summarized in conjunction with a specific installation at a brick manufacturing plant wherein the bricks after formation, leave the kiln on kiln cars which are flat, platforms supported for movement over tracks; the bricks being stacked in spaced groups on the kiln cars. In this specific installation, there are two kiln cars located on one side of a horizontal tray conveyor such as that disclosed in my above-identified copending application except that in the presently described embodiment, the trays of the conveyor each accommodate two layers of brick with each layer including sixteen rows of bricks with each row including four bricks rather than two bricks, as disclosed in my above-identified copending application.

In the first step, two groups of bricks are taken such as through conventional overhead dehacking apparatus from each of the kiln cars and moved to shuttle stations on opposite sides of the horizontal tray conveyor; each group including two layers of bricks with each layer including sixteen rows with each row including four bricks. The two groups taken for the one kiln car are deposited on two carriages at one shuttle station and the two groups of bricks taken from the other kiln car are deposited on two carriages at the other shuttle station which is located down the path of the conveyor from the first shuttle station. One of the carriages at each of the shuttle stations is in alignment with a tray of the conveyor so that the bricks on this carriage may be pushed by a pusher member operated through a pneumatic motor or ram, from the carriage directly into the aligned tray of the conveyor. The pusher member is located at a fixed station aligned with the trays of the conveyor which are indexed a certain amount in stepwise fashion for advancing the trays; there being one pusher member associated with each shuttle station. The other carriages at each of the shuttle stations are not aligned with another tray of the conveyor so that it is necessary to move the carriages along the conveyor path until the other carriages are aligned with trays of the conveyor (and the pusher member). When the latter is effected, the pusher members are then again actuated to push the group of bricks from the other carriages to aligned trays on the conveyor.

In the specific embodiment, the conveyor and the carriages are sequenced so that the two carriages at the first shuttle station load every other tray of the conveyor leaving unloaded trays to be loaded by the carriages at the second shuttle station which is downpath from the first shuttle station. The carriages may be mounted on fixed tracks parallel to the conveyor path with the carriages having rollers movable along the tracks. Any suitable motor mechanism may be employed for actuating the carriages along the tracks, for example, pneumatic motors associated respectively with the carriages at the shuttle stations.

In the specific installation wherein dehacking apparatus is employed to transport the bricks from the kiln cars to the shuttle stations by gripper members which individually grip the eleven rows of bricks and which descend in a vertical path towards the carriages to deposit the bricks on the carriages upon release of the gripper members, the opposite sides of each of the carriages are formed by movable walls which move downwardly upon engagement by the gripper members to permit the gripper members to move sufficiently close to the carriages to permit the bricks to be deposited thereon.

Two layers of bricks having been loaded on the trays of the conveyor in the aforedescribed manner, the conveyor is advanced by indexing to move the bricks towards a discharge end of the conveyor. Prior to reaching the discharge end of the conveyor, certain trays arrive at a first station at which time a void forming operation begins with the ultimate objective of removing certain entire rows of bricks from the bottom layer of bricks in said certain trays to form voids in the ultimate brick stack to be formed. At this first station, the conveyor is stopped and a gripping head descends upon the entire upper layer of bricks on the trays at said first station to grip the entire upper layer and then raise it from the lower layer and to move it four stations downpath of the conveyor where the upper layer is held above the conveyor path. The conveyor is then indexed to advance the remaining single layer of bricks to the next adjacent station at which time a gripping head descends and removes a certain number of rows of bricks from the layer to form two voids in the lower layer. The removed bricks which may be termed the "tine" bricks are then raised and moved to one side of the conveyor and stored on a horizontal plate for subsequent insertion into one of the trays of the conveyor when the accumulated "tine" bricks are sufficient to form two layers of brick with each layer including sixteen rows with four bricks in each row.

The conveyor is then indexed further to advance the lower layer with the voids therein to the next adjacent station where a number of boards of sheet wood or plastic are placed over the lower layer to provide support for the same during further handling of the lower layer when forming the ultimate stack of bricks as will be further described. After the boards are applied on the lower layer, the conveyor is then again indexed to move the lower layer of bricks to the next adjacent station which lies directly below the upper layer which, as described above, is being held by a gripping head over the conveyor path at said fourth station. The latter may then be actuated downwardly to place the upper layer of bricks on the lower void-containing, layer after which the conveyor may then again be reactivated to advance the group of bricks with the voids therein to a discharge station. At the latter station, the group of bricks are discharged transversely from the conveyor by an overhead operated pusher member which pushes the bricks onto a temporary horizontal support platform on one side of the conveyor as disclosed in my copending U.S. application, identified above. The temporary support platform is then retracted to stack the two layers of bricks just discharged from the conveyor with the voids therein, onto an underlying stacks of bricks (on an elevator) previously discharged from the conveyor. When a predetermined number of layers are reached on the elevator, the bricks thereon are conveyed to a shuttle car which is then moved adjacent a steel strapping station after which the bricks are fed from the shuttle car to the strapping station, strapping is applied to the bricks and the bricks are conveyed to an outlet for shipment or otherwise. The method and apparatus concerned with discharging the bricks from the conveyor and moving the same to the strapping station is the subject of my copending U.S. application, Ser. No. 153,577 identified above and forms no part of the invention presently being claimed in this application. The specific apparatus employed for removing the top layer of bricks and for forming voids in the bottom layer will be described in detail below.

DRAWINGS

Other objects and advantages of the present invention will become apparent from the following more detailed description taken in conjunction with the drawings in which.

DETAILED DESCRIPTION

STANDARD BRICK PACK

Figures 1, 1A, 1B, 1C, 1D, 12, 13:
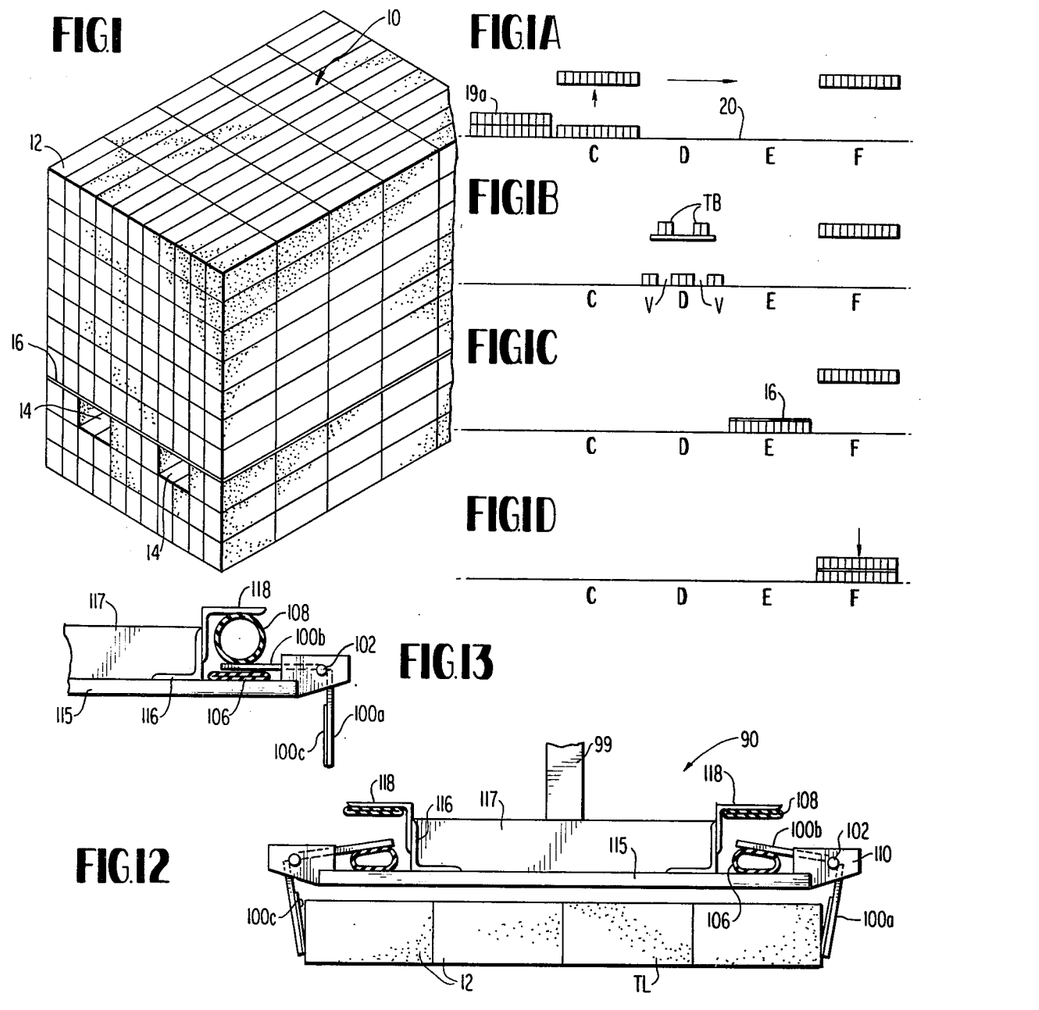
FIG. 1 is a perspective view of a standard commercial brick pack which may be formed by employing the method and apparatus of the present invention.
FIGS. 1A to 1D are diagrammatic views illustrating a method of forming voids in a layer of bricks in accordance with the present invention.
FIG. 12 is an end elevational view of a gripping head for engaging an entire layer of bricks and for raising and moving same and showing the bricks being gripped and with certain parts removed.
FIG. 13 is a view of the right-hand portion of the apparatus shown in FIG. 12 but showing a brick gripping finger in a brick releasing position.

Referring now to the drawings in detail and initially to FIG. 1, there is shown a stack of pack generally 10 of stacked bricks 12 representing a standard commercial brick pack employed for shipping the bricks such as from the point of manufacture to retail or from retail to points of use or other outlets. Pack 10 contains ten layers of bricks with each layer except the third layer from the bottom, containing eleven rows of bricks with each row containing five bricks. Although not shown, pack 10 is strapped such as by steel strapping so that it may be handled as a unit during shipment or otherwise. In the third layer from the bottom, two adjacent rows of bricks are removed at two locations in the layer to form a pair of voids 14 for receiving the tines of a forklift apparatus or similar apparatus to enable the entire pack to be conveniently raised and lowered and transported through means of a forklift. In forming voids 14 it will be seen that the third and fourth and eighth and ninth rows of bricks are removed from the third layer. Additionally, to provide support for the third layer during the prestacking phases preliminary to forming the ultimate brick pack, a board 16 is placed over the third layer to provide support. Although not shown, a board such as 16 may also be placed over the second layer of bricks to provide support for the third layer containing the voids when stacked on the second layer. Boards 16 also protect the brick surfaces from damage by the tines of a forklift. Board 16 may be made from a thin sheet of wood or plastic or any other suitable sheet or thin material. Additionally and although not shown, instead of a single board, a plurality of boards may be employed in side-by-side relationship between the third and fourth layers and between the second and third layers. It should be understood that the brick pack itself is conventional and forms no part of the present invention. However, the method and apparatus of the present invention are employed in handling bricks to form the brick pack 10 and also to form the voids 14 in certain layers of brick to be included in the final brick pack 10.

VOID FORMING METHOD

Referring now to FIG. 1A, there is diagrammatically illustrated a method of forming voids in the layer of bricks in a specific application wherein two layers of bricks are being moved along a horizontal path such as through means of a conveyor 20; 19a illustrating the two layers of bricks as originally loaded on conveyor 20. It is preferred that conveyor 20 be a tray conveyor such as disclosed in FIGS. 2 and 3 and will be described subsequently in greater detail in connection with the apparatus of the present invention. Returning now to FIG. 1a, the two layers of bricks constituting group 19a are moved to the right as viewed in FIG. 1a until the group reaches a station C intermediate the ends of the conveyor at which time the movement of the conveyor is stopped. The upper layer of bricks is then raised and separated from the lower layer at station C and then the upper layer is moved in the direction of the conveyor movement to a station F which is located before the discharge end of conveyor 20; the movements of the upper layer of bricks being illustrated by the arrows in FIG. 1a. At station F the upper layers of bricks is held above the conveyor as illustrated in FIG. 1a.

Referring to FIG. 1B, the conveyor is again indexed to advance the lower layer of bricks to the next adjacent station designated D where two pairs of adjacent rows of bricks are removed therefrom to form two voids designated V in the lower layer of bricks. As will be described below, the removed bricks TB, termed the "tine" bricks, are removed quickly and stored for subsequent insertion onto conveyor 20. Referring to FIG. 1C, conveyor 20 is again activated to advance the lower layer of bricks to the next adjacent station designated E where the conveyor is again stopped and relatively rigid sheets such as a board 16 is placed over the lower layer of bricks containing the voids.

Referring to FIG. 1D the conveyor is again activated to advance the lower void containing layer of bricks with the board 16 thereon to the next adjacent station designated F where the conveyor is again stopped. The upper layer which was being held above station F is then lowered and returned on the lower layer of bricks whereupon conveyor 20 may then again be activated to advance the two layers of brick with the voids in the lower layer, from station F to the discharge station of the conveyor. Upon discharge from the conveyor, the two layers of brick with the voids formed in the lower layer, are stacked on an elevator until ten layers are reached after which the stack of ten layers is conveyed to a steel strapping station in accordance with the method and apparatus disclosed in my copending U.S. application Ser. No. 153,577, identified above.

It is noted that FIGS. 1A through 1D illustrate only the group of bricks in which the lower layer is to contain voids. The other groups 19a of bricks composed of two layers, which are being processed on conveyor 20 at the same time at positions preceding the succeeding the group of bricks containing the voids illustrated in FIGS. 1A through 1D, have been omitted from FIGS. 1A through 1D for purposes of clarity. These other bricks are included in FIGS. 18A through 18D and other Figures in connection with the apparatus aspect of the invention to be described in more detail below. It should also be understood that when the method and apparatus of the present invention are being employed to form a standard brick pack containing layers of bricks with the voids in the third layer from the bottom, every fifth group (each group consisting of two layers), of bricks processed on the conveyor will be operated upon as illustrated in FIGS. 1A through 1D to form voids in the lower layer.

OVERALL SYSTEM

Figure 2:
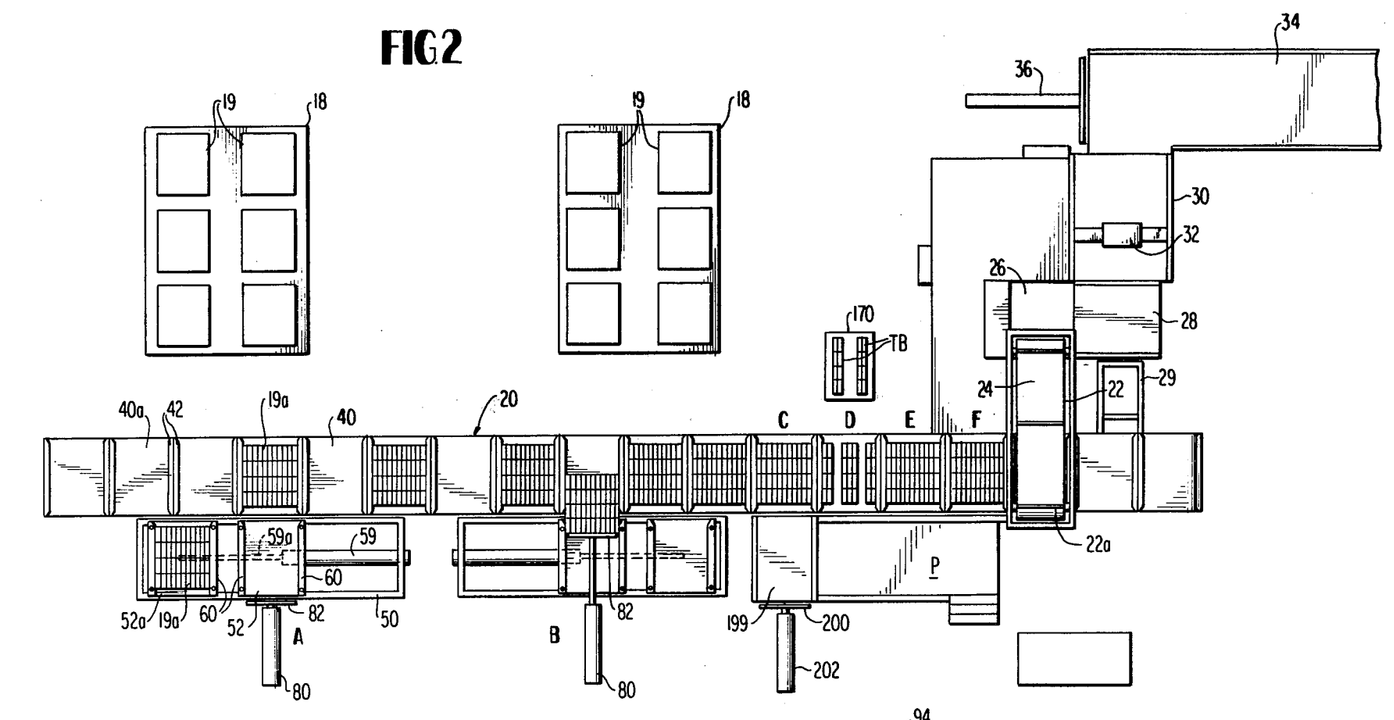
FIG. 2 is a plan view of apparatus embodying the invention (with certain parts removed for clarity) for handling bricks to form a predetermined stack of bricks.

Referring now to FIG. 2 there is illustrated apparatus embodying the invention and which may be employed in carrying out the method described above in connection with FIGS. 1A through 1D. In the specific installation illustrated in FIG. 2 which is presently in commercial operation at a brick factory, the bricks are stacked in multilayered groups designated 19 at spaced locations on a kiln car 18 which is movable on tracks into a kiln (not shown) for drying and firing and out of the kiln for subsequent processing for stacking into a pack such as the standard brick pack 10 shown in FIG. 1. After leaving the kiln, the bricks are transported via kiln cars 18 to a position on one side of a tray conveyor generally designated 20 movable along a horizontal path. By conventional means or otherwise, the bricks are taken from groups 19 on the kiln cars 18 and transferred to loading or shuttle stations designated A and B on the other side of conveyor 20 as illustrated in FIG. 2 for loading onto trays of the conveyor. In the specific method and apparatus illustrated, the bricks are loaded onto the conveyor in two layers, each layer including eleven rows of bricks with each row including four bricks; the two layer group of bricks loaded on the conveyor being generally designated 19a in FIG. 2. After the bricks are loaded in groups 19a on the conveyor, the conveyor is advanced step by step to convey bricks 19a towards a discharge station at the right-hand end of the conveyor as viewed in FIG. 2.

At stations C, D, E and F prior to the discharge station, certain groups of conveyed bricks are processed by apparatus 90 and 120 to form voids V in the lower layer in accordance with the method described above. Next following station F is the discharge station where a pusher member 22a mounted on endless chains 22 functions to laterally push the groups of bricks 19a off conveyor 20 onto a temporary horizontal support plate designated 24 which overlies an elevator (not shown) on which previously discharged bricks have been stacked. Plate 24 is moved in a horizontal plane out from under the discharged bricks 19a to deposit the same on the underlying stack of bricks on the elevator which is then lowered a step to accommodate the next group of bricks to be discharged from conveyor 20 onto plate 24. When a predetermined number of layers has been reached on the elevator, the stack is transferred from the elevator to a shuttle car generally designated 26 which is then moved to the right as viewed in FIG. 2 to a station 28 whereupon a pusher member 29 transfers the stack into a strapping apparatus generally designated 30 where a strapping head 32 applies steel strapping to the pack. The pack is then pushed to a further processing station 34 such as by a pusher member 36. The method and apparatus concerning the discharge (22, 22a, 24, 26) of the bricks, the stacking into the ultimate pack and the transfer to the strapping station, etc. are disclosed in my copending U.S. application, Ser. No. 153,577 and form no part of the invention being claimed in the present application. For a more detailed description and explanation of the discharge and stacking operation, reference should be had to my copending U.S. application.

TRAY CONVEYOR

Figure 3:
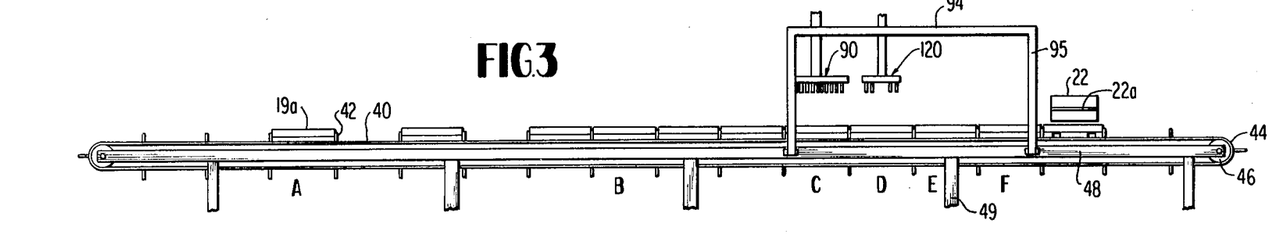
FIG. 3 is a side elevational view of portions of the apparatus shown in FIG. 2 and with parts added.

In the specific embodiment shown, the trays of conveyor 20 include a flat bottom wall 40 and upstanding opposite end walls 42 of sufficient height to contain at least two layers of bricks as shown in FIG. 3. The trays 40, 42 may be made from any suitable material such as steel, and are secured to endless drive members such as chains 44 trained about end sprockets 46 in conventional fashion as shown in FIG. 3. Any suitable structural steel framework including horizontal channels 48 supported on vertical columns 49 may be employed for supporting the trays, the endless drive chains, and the sprockets. Similarly, any suitable motor may be employed to drive the conveyor in conventional fashion. In situations where more than two layers of brick will be handled by the conveyor, side walls 42 of the trays are made with greater height. The same applies with respect to the distance between the side walls 42 in each of the trays which distance may be varied depending on the number of rows of bricks to be processed. For maximum efficiency, it is preferred that the adjacent trays be placed as close as possible to each other as is shown in FIG. 2 and 3. The operation of the conveyor is such as to permit it to be intermittently advanced and halted to permit certain operations to be formed on the bricks such as loading the bricks on the conveyor at shuttle stations A and B and subsequently forming voids in certain groups of bricks at stations C, D, E and F as will be described in greater detail. Additionally it is preferred that a push button control panel be located on a platform P adjacent stations C, D, E and F to permit an operator to advance and halt conveyor 20 during the void forming process.

LOADING AT SHUTTLE STATIONS

Figure 7:
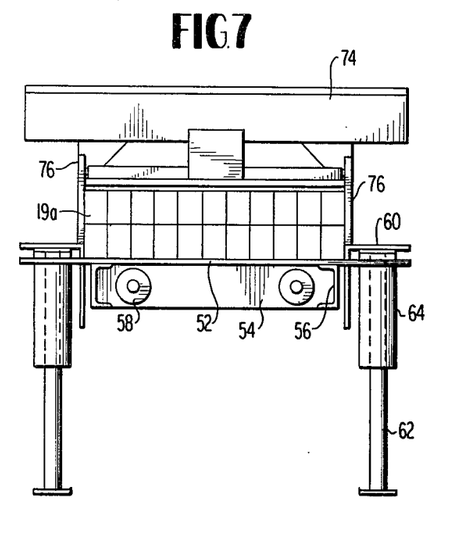
FIG. 7 is a side elevational view illustrating a carriage at a shuttle station included in the apparatus of FIG. 2 and also illustrating dehacking apparatus for loading bricks on the carriage.
Figure 8:
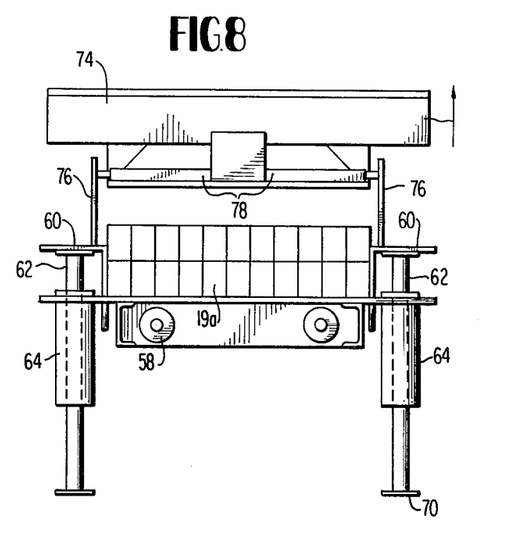
FIG. 8 is a view similar to FIG. 7 but showing the parts in a subsequent position after bricks have been loaded on the carriage and released by the overhead dehacking apparatus.
Figure 9:
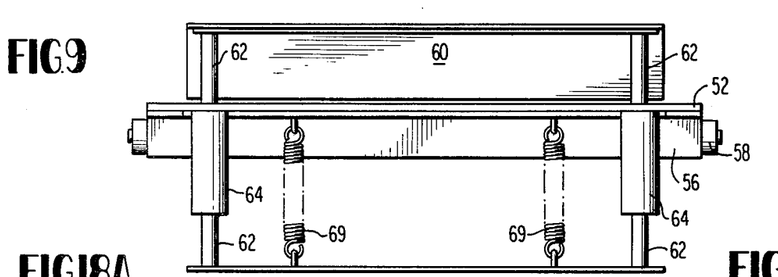
FIG. 9 is an end elevational view of the apparatus shown in FIG. 8 but excluding the overhead dehacking apparatus.

Referring now to FIG. 2 in conjunction with FIGS. 7, 8 and 9, four groups 19a of bricks are taken from the groups 19 on kiln cars 18 and loaded in two layers of sixteen over four bricks at two shuttle stations A and B shown in FIG. 2. Two groups 19a are loaded at shuttle station A and the other two groups are loaded at shuttle station B. As shown in FIG. 2 shuttle station A is identical to shuttle station B except that the latter is located down the conveyor path from shuttle station A. Shuttle station A includes two carriages each including a base or platform 52 having a generally rectangular shape and being made from suitable material such as plate steel and being of sufficient area and strength to accommodate two layers of bricks with each layer including sixteen rows of bricks with four bricks in each row.

Carriage platform 52 is mounted on side members and end members forming a rectangular frame; the side members being shown as channel steel members 56 and the end members being shown as channel steel members 54 suitably interconnected to the side members 56 such as through bolting or welding. The carriages are movable alongside the conveyor on a track including rails 50 parallel to the conveyor path; any suitable roller mechanism such as 58 being mounted in the end members 54 of the carriages to roll over tracks 50. The carriages at each station are fixed to each other in a fixed interrelationship to be actuated simultaneously as a unit. Actuation of the carriages along the tracks is achieved through a suitable motor preferably a pneumatic or hydraulic motor 59 having an operating rod 59a which is connected to both carriages at the shuttle station to move them as a unit simultaneously along the tracks into aligned positions with the trays. Alternatively, motor 59 may be connected to one of the carriages since the carriages are in fixed spaced relationship and movement of one carriage will be transmitted to the other so both move together as a unit.

In one specific embodiment wherein the bricks are moved in two groups 19a from the group 19 on kiln cars 18 by conventional overhead dehacking apparatus which grips two groups of bricks 19a and holds them in a fixed laterally spaced relationship, it is necessary that the spacing between the platforms 52 of the carriages equal the spacing of the groups of bricks 19a when held by the dehacking apparatus so as to enable the dehacking apparatus to deposit both groups 19a of bricks simultaneously on the two platforms 52 of the carriages. Inasmuch as this spacing between the platforms 52 of the carriages is not the same as the spacing between the trays of conveyor 20, it is necessary to move the carriages to alternately place the platforms 52 of the carriages in alignment with trays of the conveyor 20.

In operation and with reference only to shuttle station A, assuming both carriage platforms 52 are empty, two groups of bricks 19a are removed from the kiln car 18 and placed onto the carriage platforms 52 respectively at the same time at station A. At this point one of the carriage platforms 52 is in alignment with one of the trays of the conveyor 20 thus enabling the group of bricks 19a on the aligned carriage to be transferred therefrom to the tray of the conveyor 20; FIG. 2 showing this alignment and a group of bricks 19a just transferred from the carriage platform 52 onto the conveyor tray. Transfer of the bricks 19a from the carriage platform 52 to the conveyor trays may be accomplished in any suitable manner; one such method being through a pusher member 82 in the form of a plate in a vertical plane, operated through a pneumatic or hydraulic motor 80 so as to push the group of bricks 19a across the carriage platform 52 and directly onto the tray of conveyor 20. After the first group of bricks 19a is transferred from the carriage platform 52 onto the aligned tray, it is then necessary to actuate the carriages through motor 59 to place the other carriage platform into alignment with a tray to permit the transfer of the bricks 19a from the other carriage platform onto the aligned tray. In the specific embodiment shown, after the first carriage is discharged such as illustrated in FIG. 2 at station A, and the conveyor has been indexed twice and advanced two steps, the second following tray indicated as 40a in FIG. 2 will be positioned in alignment with pusher member 82. The carriages are then actuated to place the other carriage platform 52 containing the group of bricks 19a thereon into alignment with the pusher member 82 and the tray 40a after which motor 80 may be actuated to transfer the other group of bricks 19a onto tray 40a. It will thus be seen that in the specific embodiment shown, the groups of bricks 19a are loaded at shuttle station A into every other conveyor tray. The trays not loaded at station A are loaded at station B through a similar dual carriage shuttle system which need not be described since it is identical to the one at station A.

It will be noted from FIGS. 7, 8 and 9 that each of the carriage platforms 52 has upstanding side walls shown as inverted L-shaped angle members 60, to contain the group of bricks 19a. When the bricks are conveyed from kiln car 18 to the carriages by means of an overhead dehacker apparatus generally designated 74 in FIGS. 7 and 8, it is preferred that the side walls 60 be vertically movable to permit brick gripping fingers 76 of the dehacking apparatus 74 to properly place the group of bricks 19a on the carriage platform 52 as shown in FIG. 7. To achieve this mobility of side walls 60, the latter are each provided with depending posts 62 generally at the opposite ends thereof where they are slidably mounted in vertical sleeves 64 fixed generally to the four corners of the platform 52 to depend therefrom. The lower ends of posts 62 on each side of platform 52 are interconnected by a cross member 70 as shown in FIG. 9, and a suitable biasing mechanism such as tension springs 69 are interconnected between the frame member 56 and the lower cross member 72 to bias wall 60 in the upper or raised position shown in FIGS. 8 and 9. In operation, when the group of bricks 19a is deposited on carriage platform 52 as shown in FIG. 7, the brick gripping fingers 76 of the overhead dehacker apparatus 74 will engage the tops of side walls 60 to depress the same towards the platform 52 against the bias of springs 69 thus enabling bricks 19a to be properly positioned on the surface of the platform 52. Subsequently, when fingers 76 are expanded to release the bricks 19a and the dehacking apparatus 74 is raised away from the bricks and platform 52 as shown in FIG. 8, springs 69 will function to return the walls 60 to their normal raised position above platform 52 to contain the bricks 19a for transfer into the trays of the conveyor.

VOID FORMING

Figure 6:
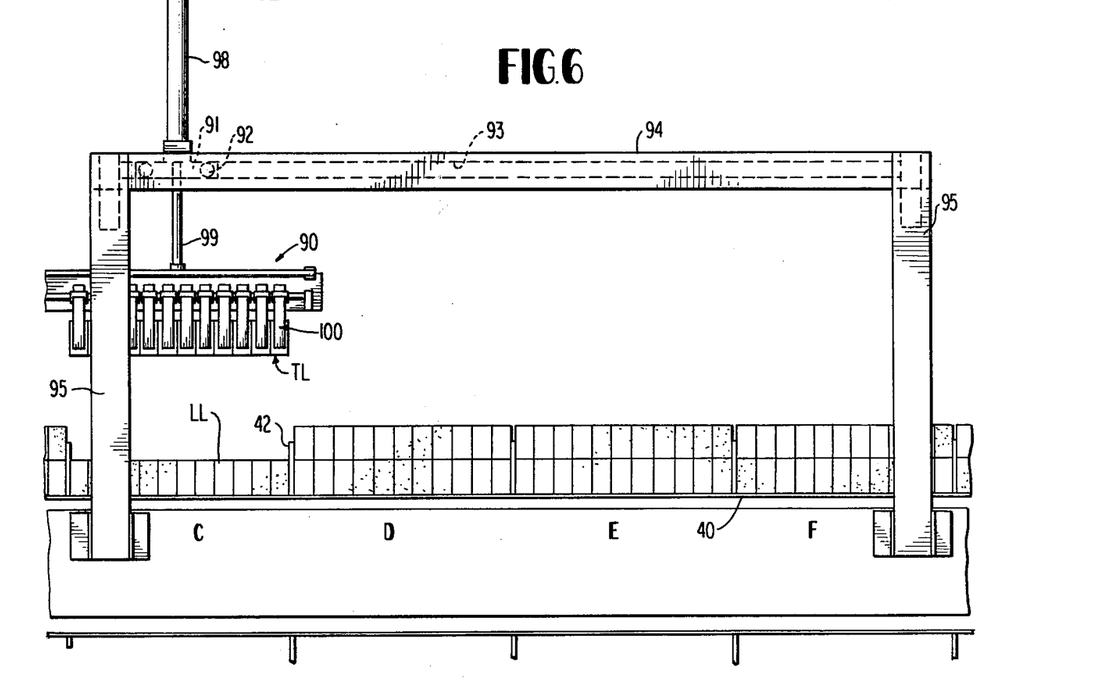
FIG. 6 is an enlarged side elevational view of a portion of the apparatus shown in FIG. 3.
Figure 18A:
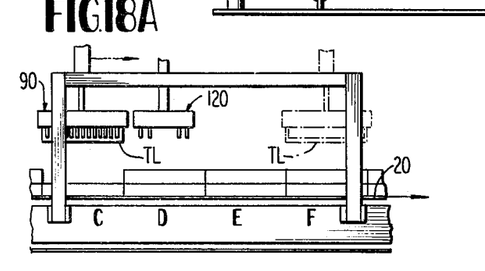
FIGS. 18A through 18D are side elevational views generally corresponding to FIG. 6 but illustrating sequential steps in removing a top layer of bricks and forming voids in the bottom layer of bricks.
Figure 18B:
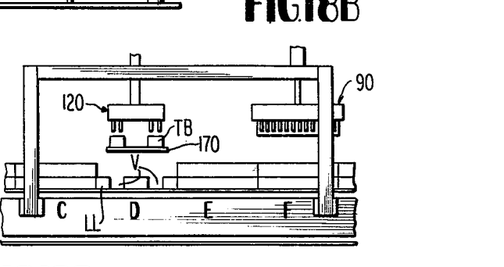
Figure 18C:
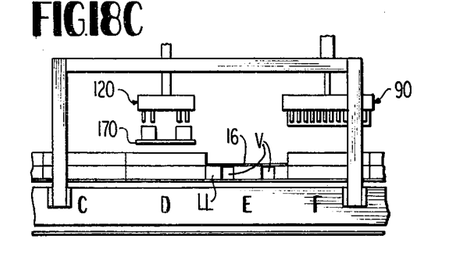
Figure 18D:
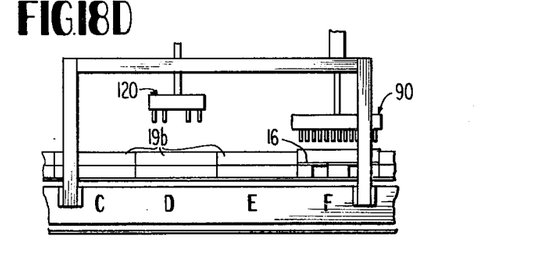

When the group of bricks 19a which is to have the void formed in the lower layer thereof reaches station C (see FIGS. 2, 3 and 18A through 18D) the void forming process summarized above begins. At this point, conveyor 20 is stopped, and an overhead gripping head generally designated 90 descends to grip the entire top layer of bricks and to raise the same away from the lower layer and then to move the top layer over the path of the conveyor four stations to station F where it holds the top layer above the conveyor. The latter is illustrated in FIG. 6 wherein the top layer is designated TL, and also in FIG. 18a which illustrates movement of the top layer four stations to station F. Conveyor 20 is then again activated to move the lower layer of bricks LL to the next adjacent station D, as illustrated in FIG. 18B, at which time the advancement of the conveyor is stopped and a brick gripping head generally designated 120 descends to engage the third, fourth and eighth, ninth rows of brick in the lower layer LL and to raise the same and move them to one side of the conveyor where they are deposited on a horizontal storage plate 170 to be described in further detail below. Conveyor 20 is again indexed to advance lower layer LL to the next adjacent station E where a board 16 is placed on the lower layer LL as shown in FIG. 18C to provide support for the same. Conveyor 20 is again indexed to advance lower layer LL to station F whereupon conveyor 20 is stopped and brick gripping head 90 descends and restores the top layer TL of bricks on the lower layer LL as illustrated in FIG. 18D and then returns to its starting position at station C. Conveyor 20 is then activated to move the group of bricks containing the voids to the discharge station where pusher member 22a discharges the same from the conveyor 20 in the manner described above.

The tine bricks which where removed from the lower layer LL of bricks in station D are stored on a horizontal plate 170 diagrammatically illustrated in FIG. 2 on one side of conveyor 20. After receiving the tine brick, plate 170 is actuated across conveyor 20 to allow the operator standing on platform P to remove the tine bricks TB from plate 170 and to place them on a charging platform 199 aligned with the trays of conveyor 20. Periodically, the operator standing on platform P who controls the indexing movement of the conveyor 20 calls for an empty tray so that when two layers of eleven over four brick are accumulated on charging platform 199, they may be transferred to the called empty tray by means of a pusher member in the form of a vertical plate 200 operated by a pneumatic cylinder or motor 202 under control of the operator standing at platform P. Movement of storage plate 170 across the conveyor as well as the gripping of the top layer TL and lower layer LL of bricks and forming the voids as described above, will be described below. The apparatus pertaining to the latter features have been removed from FIG. 2 for purposes of clarity. Although not shown, other apparatus may be utilized for transferring the accumulated tine brick directly from plate 170 to the conveyor tray.

Figure 4:
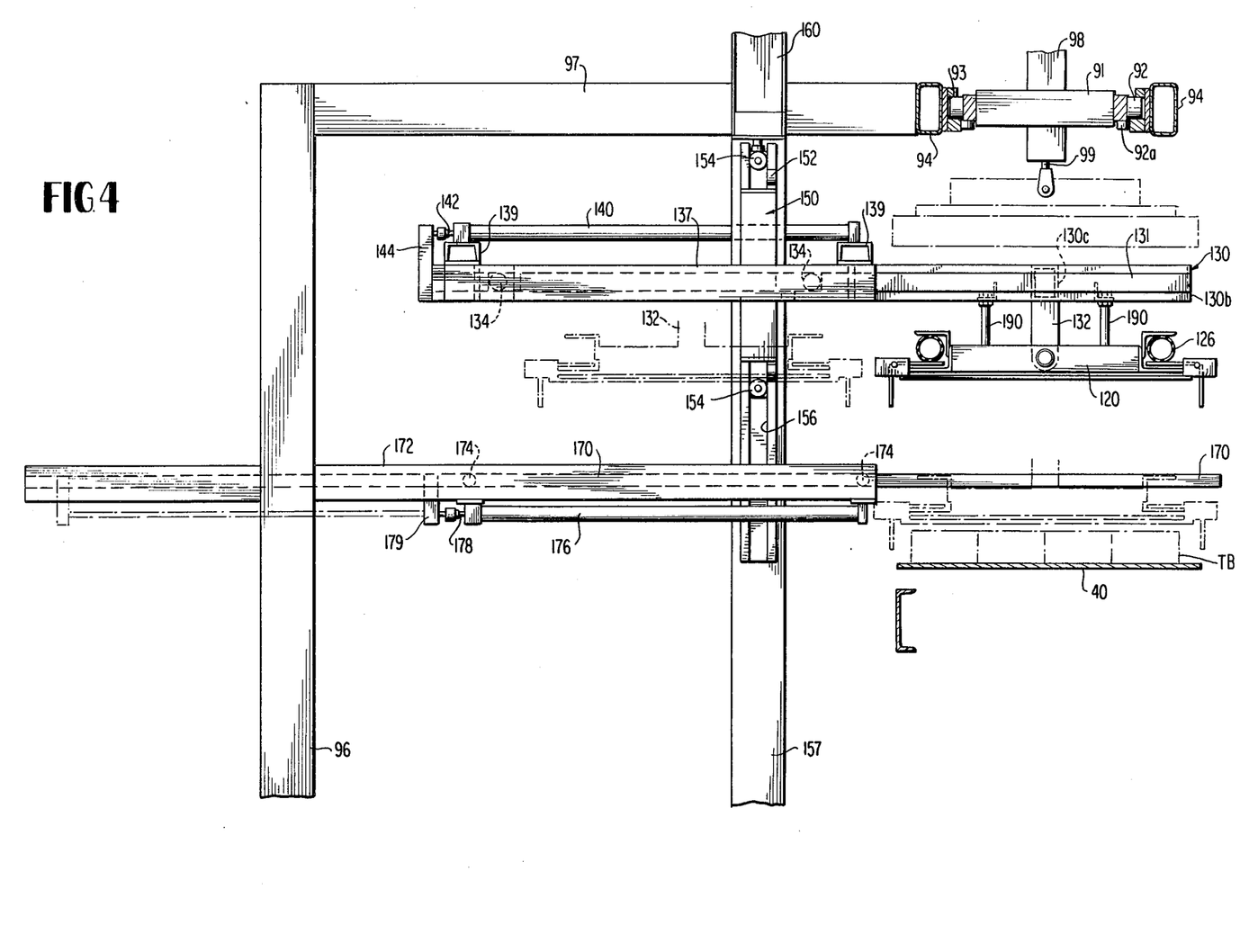
FIG. 4 is an enlarged end elevational view of apparatus (included in the apparatus of FIG. 2) employed for forming voids in layers of bricks in accordance with the present invention; with certain portions shown in phantom lines to indicate different positions of certain movable parts.

Referring to FIGS. 4 and 6, gripping head 90 employed to grip the entire top layer TL of bricks prior to forming the voids in the lower layer LL, is actuated vertically to raise and lower the gripped bricks, by means of a suitable motor such as a pneumatic motor 98 having an actuating rod 99 connected to the gripping head 90. Horizontal movement of brick gripping head 90 to move the same between stations C and F as described above, is achieved through a carriage generally designated 91 in which pneumatic motor 98 is suitably mounted to be movable with the carriage along a fixed horizontal path defined by tracks 93 parallel and overlying the conveyor path between stations C and F as illustrated in FIG. 6. Tracks 93 are secured to horizontal beams 94 supported at their opposite ends by vertical columns 95. Carriage 91 is provided with suitable rollers 92 on opposite sides thereof received in tracks 93. Additionally, another pair of rollers 92a (see FIG. 4) is provided between carriage 91 and tracks 93 to further guide and facilitate movement of the carriage.

BRICK GRIPPING HEAD 90

Figure 14:
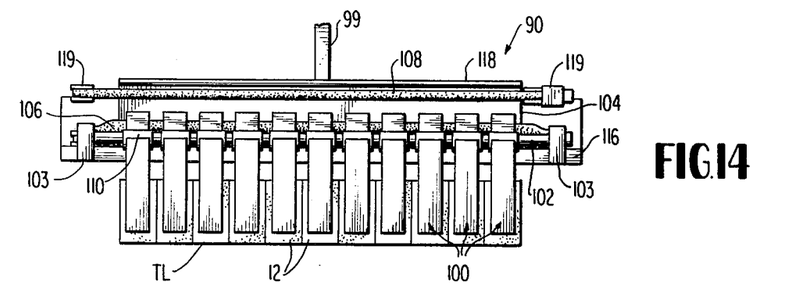
FIG. 14 is a side elevational view of the gripping head apparatus shown in FIG. 12 and also showing certain bricks in gripped position.

Referring now to FIGS. 12 and 14 brick gripping head 90 includes a base 115 which may be in the form of a rectangular steel plate or other suitable member, having an upstanding generally rectangular frame formed by angle irons, for example, 116 and 117 suitably attached such as by welding or bolting to base 115. On opposite sides of base 115 are pivotally mounted a plurality of L-shaped brick gripping members generally designated 100; there being eleven brick gripping members on each side of the base 115 for enabling pick up of eleven rows of bricks. It will be appreciated that in situations where greater or lesser number of rows of bricks are being processed, the number of brick gripping fingers 100 will be increased or reduced accordingly. Brick gripping fingers 100 are mounted about horizontal shafts 102 for pivotal movement; shafts 102 being suitably mounted parallel to base 115 through means of lugs 103 fixed to opposite ends of base 115. Brick gripping fingers 100 are spaced along shafts 102 so that each brick gripping finger will be capable of gripping an individual brick 12 as illustrated in FIG. 14. The spacing of gripping fingers 100 is achieved through suitable spacer members 110 fixed on shaft 102 over the corner portions of gripping fingers 100 to maintain gripping fingers 100 in the proper position along shaft 102.

Actuation of brick gripping fingers 100 may be achieved in any suitable manner; one such method being illustrated in FIGS. 12, 13 and 14 as employing what will be termed air bags 106 and 108 in the form of elongated inflatable and deflatable flexible conduits. Brick gripping fingers 100 are formed with depending lower portions 100a adapted to grip the brick as illustrated in FIGS. 12 and 14, and upper portions 100b extending at an angle say of 90° relative to lower portion 100a for actuating the gripping fingers between an outer, brick release position shown in FIG. 13 and an inner, brick gripping position shown in FIG. 12. Upper portions 100b of brick gripping fingers 100 extend inwardly from shafts 102 to be positioned between an overlying air bag 108 and an underlying air bag 106. Upper air bag 108 extends below an angle iron 118 fixed to frame member 116 as shown in FIGS. 12, 13 and 14 and is suitably mounted at its opposite ends by means of fittings 119 secured to the frame. Lower air bag 106 is similarly mounted relative to base 115 to underlie upper portions 100b of brick gripping fingers 100. The ends of the air bags 106 and 108 are connected to a source of air and other air control conduits and valves (not shown) so that they may be alternately inflated and deflated to pivot the brick gripping fingers 100a into brick release or brick engaging positions.

It will be appreciated that when the upper air bag 108 is inflated as shown in FIG. 13, air bag 108 will engage the upper portions 100b of fingers 100 to move the same downwardly in pivotal motion about shaft 102 thereby moving lower brick gripping finger portions 100a away from the brick in counterclockwise direction as viewed in FIG. 13 for releasing bricks. When the upper air bag 108 is deflated and the lower air bag is inflated as shown in FIG. 12, the opposite motion of brick gripping fingers will result to cause the lower brick gripping finger portions 100a to pivot inwardly. To minimize damage to the bricks as well as to ensure proper gripping action, the inner surfaces of finger portions 100a are provided with flexible linings such as rubber or plastic pads 100c of suitable flexibility and strength.

TINE BRICK GRIPPING HEAD

Figure 10:
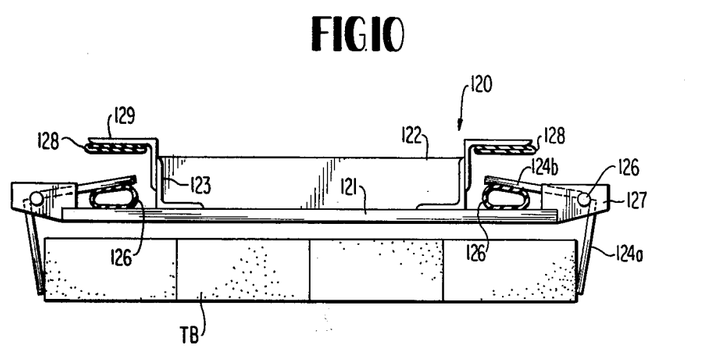
FIG. 10 is an end elevational view of a gripping head (included in the apparatus of FIG. 4) employed for removing bricks (tine bricks) from a layer of bricks to form voids therein and also showing bricks gripped by the gripping head but with certain parts removed for clarity.
Figure 11:
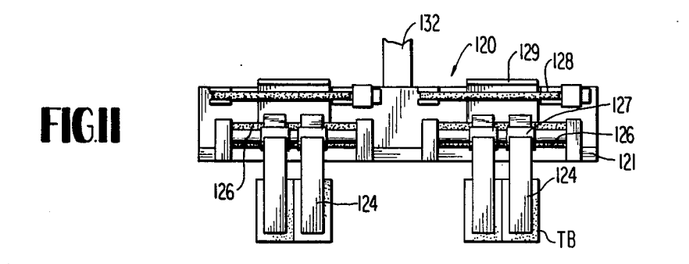
FIG. 11 is a side elevational view of the gripping head shown in FIG. 10.

Removal of the tine brick TB at station D to form the voids in the lower layer LL of bricks is effected by a tine brick gripping head generally designated 120 and illustrated in FIGS. 10 and 11. Being similar to gripping head 90 for gripping the entire top layer TL of bricks, tine brick gripping head 120 includes a generally rectangular base 121 having secured to its upper surface a rectangular steel frame including angle members 122 and 123 secured to each other and to the base 121 through bolts or welding. For gripping the tine brick, two pairs of gripping fingers 124 are mounted on shafts 126 on opposite sides of the base 121 as shown in FIGS. 10 and 11. Fingers 124 are maintained in the proper position on shaft 126 through suitable spacers 127 secured to shaft 126 and base 121. A pair of air bags 126 and 128 are provided on each side of the base 121 to respectively overlie and underlie the arm portions 124b of gripping fingers 124 as shown in FIG. 10. Air bags 126 and 128 are suitably secured at their opposite ends to the frame to permit inflation and deflation thereof from a suitable air supply source. Upper air bags 128 are contained by angle irons 129 secured to frame angle members 123 as shown in FIGS. 10 and 11 so that upon inflation air bags 128 will expand downwardly to engage finger portions 124b. Lower air bag 126 is contained against downward expansion upon inflation by base 126 as shown in FIG. 10. When upper air bags 128 are deflated and lower air bags 126 inflated, the lower portions 124a of the gripping fingers will engage the tine bricks as shown in FIG. 10 to hold the same. When upper air bags 128 are inflated and lower air bags 126 deflated, upper air bags will engage portions 24b of the gripping fingers to pivot the gripping fingers counterclockwise for releasing the bricks. It will be understood that two pairs of fingers 124 are provided on each side of the head 120 so that two pairs of rows of bricks will be removed from the lower layer of bricks by head 120 during the void forming process described above. Although not shown, it is preferred that finger portions 124a be provided on their inner surfaces with flexible gripping pads to facilitate gripping of the bricks while minimizing damage to the bricks.

Figure 5:
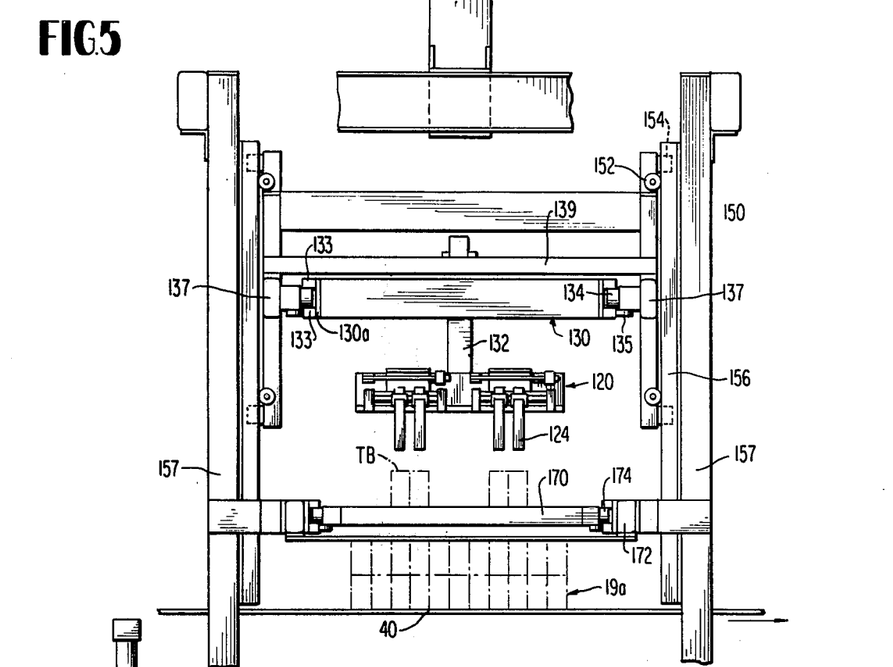
FIG. 5 is a side elevational view with certain parts removed of the apparatus shown in FIG. 4.

Referring now to FIGS. 4 and 5, in order to permit the tine brick gripping head 120 to be moved vertically downwardly to engage and pick up tine brick TB and then to move upwardly to deposite the tine brick on temporary storage plate 170 gripping head 120 is mounted on a movable frame 130 which is vertically movable through mounting at its opposite sides to a carriage 150 which moves in a vertical plane along tracks 156 attached to vertical columns 157. Gripping head frame 130 is also movable in a horizontal plane between positions overlying conveyor 20 for picking up tine brick and to one side of conveyor 20 for depositing the tine brick on storage plate 170.

Gripping head frame 130 has a rectangular configuration which may be made from suitable structural steel members including opposite parallel side members 130a connected by end members 130b and intermediate cross members such as 130c shown in FIG. 4. Brick gripping head 120 is suspended from frame 130 through a main stem 132 connected to frame 130 such as at cross beam 130c. For additional support, a plurality of stems 190 may further be interconnected between head 120 and frame 130 as shown in FIG. 4. Fixed to each of side frame members 130a of frame 130 are lugs 133 forming a track 131 by which frame 130 is mounted for horizontal movement relative to a frame 137 which is secured to vertically movable carriage 150 as described above. A plurality of rollers 134 are provided on frame 137 to be received in track 131 of movable frame 130 to guide and facilitate movement of frame 130. Additional rollers 135 may be provided to further facilitate movement of frame 130 relative to frame 137.

Extension of tine brick gripping head 120 over conveyor 20 and retraction of the same to one side of the conveyor is achieved through a motor preferably a hydraulic or pneumatic motor 140 mounted to frame 137 such as through cross frame members 139 fixed to the opposite end portions of frame 137. Pneumatic motor 140 has an actuating rod 142 which is connected to horizontally movable frame 130 through means of a strap 144 as shown in FIG. 4. Extension of actuating rod 142 by a motor 140 will cause tine brick gripping head 120 to move to one side of the conveyor as shown in dotted lines in FIG. 4 while retraction of actuating rod 142 will cause gripping head 120 to move over the conveyor into the full line position shown in FIG. 4.

As described above, tine brick gripping head 120 is also movable in a vertical path toward and away from conveyor 20 by movement of carriage 150 along tracks 156 secured on column 157; it being understood that frame 137 is secured to carriage 150 to extend generally at right angles thereto. Carriage 150 is provided with rollers 154 received in tracks 156 as well as additional rollers 152 movable over one of the flanges of tracks 156 as shown in FIGS. 4 and 5. Vertically movable carriage 150 is actuated along track 156 by any suitable motor preferably a pneumatic motor (not shown).

After tine brick TB are picked up by gripping head 120, the latter is raised and then moved to one side of the conveyor and then lowered to place the tine brick on storage plate 170 mounted in a horizontal plane for movement between a retracted position to one side of the conveyor as indicated by dotted lines in FIG. 4, and an extended position overlying conveyor 40 as indicated by the full lines in FIG. 4. The retracted position of storage plate 170 is employed to receive tine brick TB from gripping head 120 while the extended position of plate 170 is employed to position the tine brick sufficiently close to platform P (see FIG. 2) to enable the operator standing on platform P to remove the tine brick TB and deposit them on charging platform 199 for reentry into the tray 40 of conveyor 20 as described above. Horizontal movement of platform 170 between its extended and retracted positions is achieved through rollers 174 on opposite sides thereof mounted in tracks formed in a fixed frame 172, and a motor preferably a pneumatic motor 176 having an actuating rod 178 connected to plate 170 by means of a strap 179. Frame 172 is formed from structural steel members suitably fixed to and between columns 157 in a horizontal plane. Motor 176 is secured to the underside of frame 172 as shown in FIG. 4.

Figure 17A:
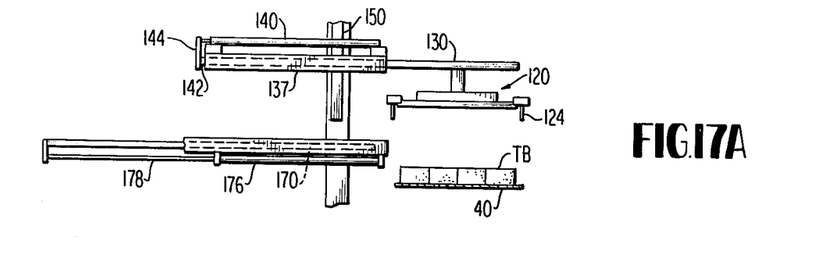
FIGS. 17A through 17E are end elevational views of the apparatus of FIG. 4 illustrating sequential steps in removing rows of bricks from a bottom layer of bricks to form voids therein.
Figure 17B:
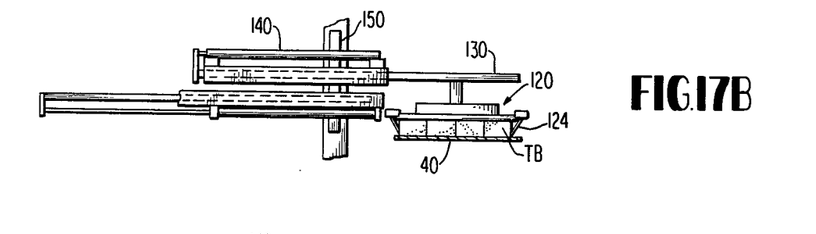
Figure 17C:
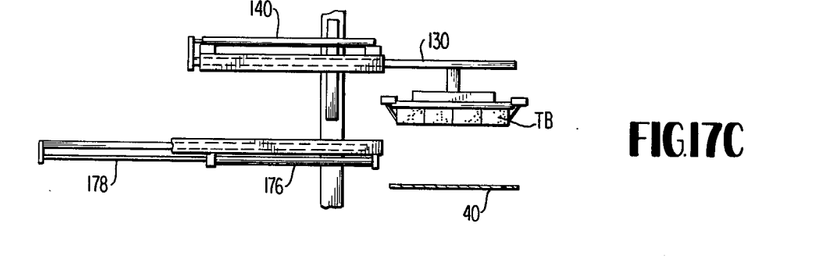
Figure 17D:
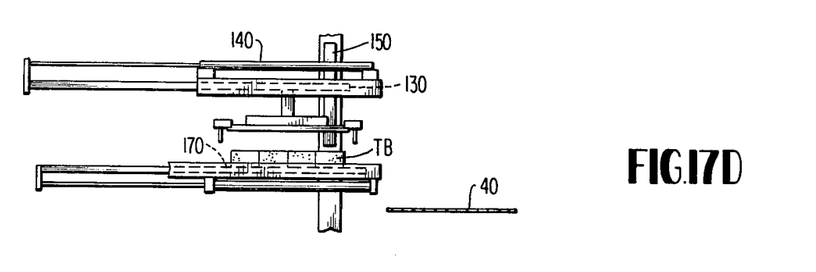
Figure 17E:
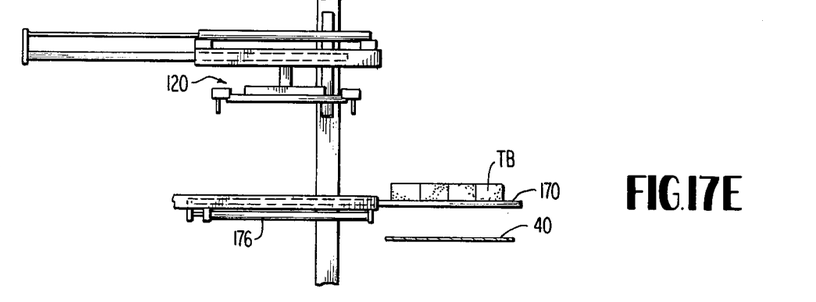

To summarize removal of the tine brick TB in the void forming operation, when the lower layer of bricks LL reaches station D (see FIGS. 2 and 18B) advancement of conveyor 20 is stopped, and referring to FIG. 17A, pneumatic motor 140 is actuated to extend movable frame 130 of pick up head 120 outwardly over conveyor 20 as shown in FIG. 17A. Storage plate 170 being retracted, carriage 150 is then lowered to lower frame 130 and pick up head 120 to position tine brick gripping fingers 124 for gripping the tine bricks TB as shown in FIG. 17B upon inflation and deflation of air bags 126 and 128 as described above. Carriage 150 is then moved upwardly to remove tine brick TB from the lower layer LL of bricks as shown in FIG. 17C. The remaining bricks in the lower layer left on tray 40 of conveyor 20 have not been shown in FIG. 17C to avoid confusion. Frame 130 of pick up head 120 is then retracted to one side of the conveyor upon actuation of motor 140 after which carriage 150 is moved downwardly to place tine brick TB on plate 170 as shown in FIG. 17D at which time gripping fingers 124 may be actuated to release the tine brick on plate 170. Carriage 150 may then be raised to its original position shown in FIG. 17A after which plate 170 is extended by actuating motor 176 to position tine brick TB over the conveyor path (see FIG. 17E) to permit the operator standing on platform P to remove the tine brick from plate 170 and place them on charging platform 199 shown in FIG. 2.

The tine brick having been removed from lower brick layer LL, conveyor 20 may again be activated to index the lower layer with the voids V therein to station E as shown in FIG. 18C at which station the operator standing on platform P applies a board 16 over lower layer LL. When the latter is completed, the operator on platform P again reactivates the conveyor to advance the lower layer with voids V therein and board 16 thereon, to station F at which time the conveyor is again stopped. Motor 98 is then actuated to lower pick up head 90 to restore top layer TL on the lower layer LL as illustrated in FIG. 18D; it being understood that after the top layer is placed upon the lower layer, fingers 100 of gripping head 90 are pivoted outwardly to release the top layer of bricks. Gripping head 90 may then be returned to its original position at station C as shown in FIG. 6. The operator on platform P may then again advance the conveyor to bring the group of bricks 19a with the voids in the lower layer to a discharge station for discharge from the conveyor by pusher members 22a in the manner described above.

Although the aforedescribed void forming operation requires that the top layer of the group of bricks whose lower layer is to contain the voids, be raised above the lower layer to provide access for removing the tine bricks from the lower layer, the voids may also be formed in another way to avoid the necessity of gripper head 90 which is employed to raise the top layer. This is done by conveying the layer which is to have the voids as a single layer, that is, without an top layer. This may be effected, for example, when forming a standard brick pack which has ten layers, by conveying the bricks in four successive trays in two layers and then the next successive tray in one layer which is to have the void, and the next tray in one layer. The tine brick removal head 120 may then be employed to remove the tine brick from the single layer on the tray in the manner described above. The layer with the voids therein may then be discharged from conveyor 20 as a single layer, after the voids are formed therein. Another alternative in forming a standard brick pack containing ten layers is to convey bricks in three successive trays in two layers per tray with the fourth tray containing three layers and with the fifth tray containing a single layer which is to have the voids. This again avoids the necessity of employing the pick up head 90 and its associated apparatus for removing the top layer as described above.

Figure 15:
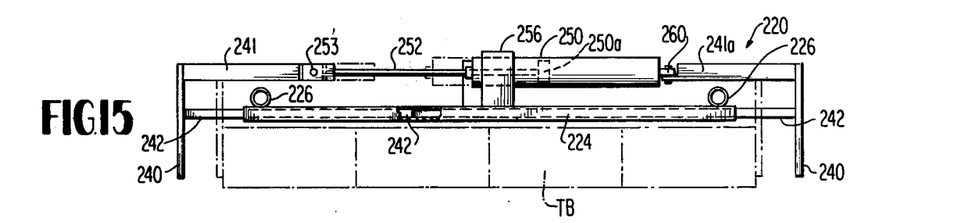
FIG. 15 is a view generally similar to FIG. 10 but of a modified form of a gripping head for gripping tine bricks, but with the brick and certain parts of the gripping apparatus shown in phantom lines.
Figure 16:
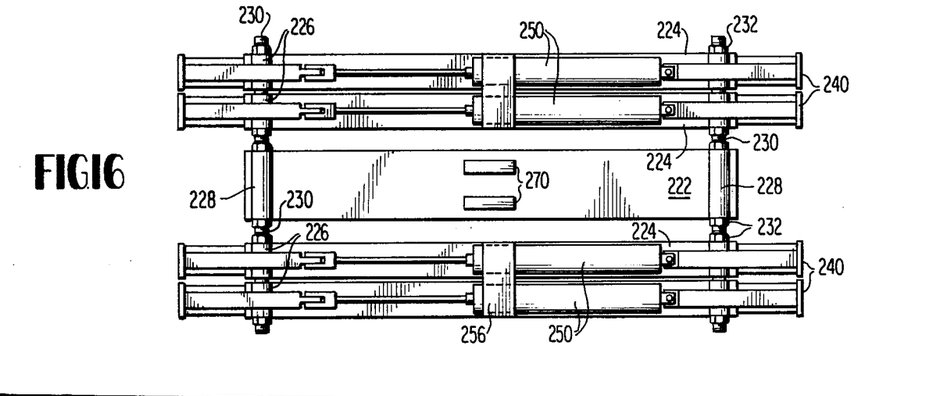
FIG. 16 is a plan view of the modified gripping head shown in FIG. 15.

Referring to FIGS. 15 and 16, there is illustrated a modified tine brick pick up head, that is, a modification of pick up head 120 shown in FIG. 10 and described above. The modified pick up head generally designated 220 includes a main frame in the form of a steel bar 222 having on opposite sides thereof two pairs of parallel rectangular tubes 224. Rectangular tubes 224 are connected to each other as well as main frame 222 by means of threaded rods 230 received in steel tubes 226 fixed across the top surfaces of main frame 222 and frame tubes 224. Tubes 226 are secured in proper position relative to each other and relative to frame 222 by lock nuts 232 received on rods 230 on opposite sides of the frame members. Preferably the insides of tubes 226 are threaded to receive the threads on rods 230.

Slidably mounted in each of frame tubes 224 are brick gripping fingers 240; the mounting being accomplished by stems 242 fixed to fingers 240 at right angles thereto and slidably received in tubes 224. Stems 242 have a rectangular cross section corresponding to that of frame tubes 224. The innermost position of gripping fingers 240, as shown in dotted lines in FIG. 15, is employed for gripping the tine brick TB as illustrated in FIG. 15. The outermost position of fingers 240 is employed to release tine bricks TB.

Actuation of brick gripping fingers 240 is achieved through a suitable motor mechanism preferably a plurality of air cylinders 250 respectively associated with each opposite pair of gripping fingers as illustrated in FIG. 16. Each pneumatic motor 250 is mounted for slidable movement to the top of the associated tubular frame 224 through an upstanding bracket 256 with the cylinder lying in a plane parallel above tubular frame member 224. One end of the pneumatic cylinder is connected at 260 to a gripping finger 240 via an arm 241a which is rigidly secured to finger 240 at right angles thereto as illustrated in FIG. 15. The other gripping finger is connected to the extendable and retractable piston rod 252 of air cylinder 250 by means of an arm 241 and a connection at 253 shown in FIG. 15. Any suitable piston arrangement may be provided in air cylinder 250 so that upon supply or exhaust of air in and from cylinder 250, fingers 240 may be rectilinearly moved into or out of engagement with tine brick TB: the movement of fingers 240 being guided and constrained by stems 242 slidable in tubes 224. In the embodiment shown, wherein pneumatic motor 250 has a single internal piston 250a fixed to piston rod 252, when air is supplied to the left-hand side of piston 250a as viewed in FIG. 15, this will cause the piston together with rod 252 to move to the right thereby bringing the left-hand gripper 240 into engagement with the brick at which time continued introduction of air to the left of piston 250a will cause the entire cylinder 250 to move to the left as indicated by the phantom lines in FIG. 15 until the right-hand gripper member 240 engages the right-hand side of the tine bricks TB. Lateral and vertical movement of the pneumatic motor 250 is prevented by the upstanding bracket 256 associated therewith which straddles and overlies the cylinder 250. Brackets 256 although shown in FIG. 15 have been omitted from FIG. 16 for purposes of clarity.

Vertical movement of the entire tine brick gripping head 220 may be achieved in the same manner described above in connection with gripping head 120 by means of a vertical stem suitably attached to frame 222 at upstanding lugs 270 shown in FIG. 16; the vertical stem being mounted to a movable frame such as 130 described above.

If desired and although not shown, a dual piston arrangement can be provided in each of the pneumatic motor cylinders 250 with two actuating or piston rods connected to the pistons and gripping fingers 240 respectively. In this modification, pneumatic motor cylinders 250 would be secured against all movement on the frame, and movement of fingers 240 would be achieved solely through their associated piston rods.

What is claimed is:

1. In the process of stacking a plurality of layers of bricks into a stack with the bricks in each layer arranged in generally parallel rows; the steps comprising: conveying one of said layers along a horizontal path to a discharge station for stacking said one layer after discharge at said discharge station, and prior to said one layer reaching said discharge station removing a number of rows of brick from said one layer of bricks and said path to form a number of voids in said one layer of bricks, and wherein said one layer of brick is conveyed along said path while having thereon a second layer of bricks including a plurality of rows of bricks, and wherein said second layer of bricks is removed from said first layer prior to removal of said number of rows of bricks from said first layer, and wherein a sheet-like member is placed over said first layer of bricks after said number of rows of bricks are removed therefrom and subsequently a second layer of bricks is placed on said first layer of bricks.

2. The method defined in claim 1 wherein said number of rows of bricks removed from said one layer of bricks is removed by lifting said number of rows from said one layer of bricks.

3. The method defined in claim 2 employing a brick gripping head for gripping said number of rows and for lifting the same from said layer of bricks.

4. The method defined in claim 3 including the step of moving said gripping head with the said rows of removed brick held by said gripping head to transport said removed bricks to a storage area.

5. The process defined in claim 4 further including the step of depositing said removed bricks on a storage member at said storage area.

6. The method defined in claim 5 further including the step of moving said storage member for transporting said removed bricks to another station.

7. The method defined in claim 3 wherein there is employed a gripper head having a number of pairs of opposite gripping fingers corresponding to the number of rows of bricks to be removed, the gripping fingers being actuated to grip the outermost positioned bricks in said number of rows for removing the entire row from said layer of bricks.

8. The method defined in claim 1 further including the step of accumulating said rows of bricks removed from said layer to form another layer of bricks for stacking in said process.

9. The method defined in claim 8 wherein said number of rows of removed bricks are stored and accumulated adjacent said path for subsequent conveyance along said path.

10. The method defined in claim 9 wherein said number of rows of removed bricks are stored on a plate on one side of said path and wherein said plate is moved for transporting said removed rows of bricks to a further station for feeding said removed bricks on said path.

11. The method defined in claim 1 wherein at least two spaced rows of bricks are removed from said one layer of bricks to form at least two voids in said one layer of bricks.

12. The method defined in claim 11 wherein said one layer includes eleven rows of bricks wherein the third and fourth and eighth and ninth rows of bricks in said one layer are removed.

13. The method defined in claim 1 wherein after said number of rows of bricks are removed from said first layer of bricks, said first layer of bricks is conveyed further along said path after which said second layer of bricks is restored on said first layer of bricks at a point down said path from said point of removal of said number of rows of bricks from said first layer of bricks.

14. The method defined in claim 13 wherein said second layer of bricks is removed from said first layer of bricks by lifting said second layer of bricks and subsequently moving said second layer of bricks over and down said path for placement on said first layer of bricks.

15. The method defined in claim 1 wherein a horizontally moving tray conveyor is employed for moving said one layer of bricks along said path, said one layer of bricks being received on a tray of said conveyor, the tray including spaced upstanding walls for containing said one layer of bricks thereon.

16. The method defined in claim 14 wherein said second layer of bricks after removal from said first layer is held over said path at a location downpath from the point of removal from the first layer until the first layer reaches said location at which time the second layer is restored on said first layer.

17. The method defined in claim 1 applied to a layer of bricks wherein each row of bricks contains a plurality of bricks.

18. A method of forming at least one void in a multilayered group of bricks comprising the steps of: removing an upper layer of the bricks to expose the next lower layer of bricks for handling, removing a number of bricks from said lower layer, and restoring said upper layer on said lower layer, and wherein prior to restoring said upper layer on said lower layer a sheet-like member is placed over the lower layer.

19. The method defined in claim 18 wherein after said upper layer is removed from said lower layer said upper layer is moved to a station spaced from said lower layer and wherein said lower layer is moved to said station and then said upper layer is restored on said lower layer at said station.

20. The method defined in claim 19 wherein said upper layer of bricks is removed from said lower layer and subsequently returned on said lower layer respectively at two spaced stations along a horizontal conveyor path.

21. The method defined in claim 20 wherein a plurality of multilayered groups of bricks are conveyed in longitudinally spaced positions along said conveyor path and wherein selected groups of said multilayered bricks conveyed along said path are operated upon to form said voids.

22. The method defined in claim 21 wherein said multilayered group of bricks each contain only two layers of bricks and wherein every fifth group of bricks conveyed along said path is operated upon to form said void.

23. The method defined in claim 21 wherein a horizontal tray conveyor is employed to move said multilayered group of bricks along said path, the conveyor having a plurality of discrete trays longitudinally spaced along said conveyor path, and wherein at least one pair of said groups of multilayered bricks is brought from a supply station to a transfer station along said conveyor path and wherein at least one group of bricks in each pair is moved along said conveyor path at said transfer station into alignment with a tray of said conveyor for loading onto said last recited tray.

24. The method defined in claim 23 wherein the other group of bricks in said pair is brought from said supply area to said transfer station in alignment with another tray of the conveyor for loading thereon.

25. The method defined in claim 24 wherein every other tray of the conveyor is loaded with groups of bricks at said transfer station.

26. The method defined in claim 18 wherein after removal of said upper layer from said lower layer, said upper and lower layers are conveyed to a station and said upper layer is restored on said lower layer at said station.

27. The method defined in claim 26 wherein said upper layer is removed from said lower layer by raising the upper layer relative to the lower layer and wherein said upper and lower layers are moved to said station along a horizontal path, and wherein said upper layer is restored on said lower layer by movement downwardly in a vertical plane.

28. The method defined in claim 18 applied to a multilayered group of bricks wherein each layer contains a plurality of generally parallel rows of bricks with each row of bricks containing a plurality of bricks and wherein an entire row of bricks is removed from said lower layer.

29. The method defined in claim 28 wherein in removing said entire row of bricks from said lower layer the outermost bricks in said row are engaged and urged inwardly to engage the inwardly positioned bricks in said row and wherein the entire said row of bricks is raised out of said lower layer.

30. Apparatus for handling and forming voids in a layer of bricks wherein the bricks are arranged in a number of generally parallel rows with each row containing a least one brick; the apparatus comprising in combination a storage member, and first means for removing at least one row of bricks from said layer of bricks to form a void in the layer of bricks and for depositing said removed row of bricks on said storage member, and wherein the apparatus includes conveyor means for conveying said layer of bricks over a conveyor path to a stacking station wherein said layer of bricks is to be stacked, and wherein said first means is positioned to remove said rows of bricks while said layer of bricks is on said path prior to reaching said stacking station, and wherein said storage member is independent of said conveyor means and positioned to receive bricks at a station along said conveyor means prior to said stacking station, and wherein there is further included second means for moving said storage member of conveying the removed row of bricks to a charging station for returning said removed row of bricks to said conveyor path, said charging station being located adjacent said conveyor path.

31. Apparatus defined in claim 30 wherein said second means mounts said storage member for movement in a horizontal plane between a first position for receiving said removed row of bricks and a second position for conveying said removed row of bricks to said station.

32. Apparatus defined in claim 30 further including means at said charging station for feeding said removed row of bricks to said path from said charging station.

33. Apparatus defined in claim 30 wherein said first means has brick engaging members for engaging and holding said row of bricks to be removed from the layer of bricks and wherein there is further included first mounting means for mounting said brick engaging members for movement in a horizontal plane between a first position overlying said layer of bricks and a second position adjacent said storage member, and second mounting means mounting said first mounting means for movement in a vertical plane for permitting said brick engaging members to raise said one row of bricks to remove the same from layer of bricks.

34. Apparatus defined in claim 33 further including third mounting means mounting said storage member for movement between a first position for receiving bricks from said first means and a second position for conveying said removed bricks to a further processing station.

35. Apparatus defined in claim 30 wherein said layer of bricks is included in a group of multilayered bricks being conveyed over said path and wherein there is further included second means for removing from said group of bricks an upper layer to expose said first defined layer for permitting said first means to remove said row of bricks therefrom to form said voids.

36. Apparatus defined in claim 35 wherein said first means is positioned at a first station along said path and wherein there is further included means for moving said third means over said path to a second station downpath of said first station for restoring said upper layer of bricks on said first defined layer after said voids have been formed in said first defined layer.

37. Apparatus defined in claim 30 further including horizontal conveyor means for conveying said layer of bricks over said path, said conveyor means including a plurality of discrete trays spaced along said path, said conveyor means having a loading area for loading bricks thereon, said loading area including a first transfer station including a horizontal platform movable along said path for aligning layers of bricks with trays of said conveyor means.

38. Apparatus defined in claim 37 wherein said platform at said transfer station included a pair of oppositely positioned upstanding walls for containing bricks on said platform, said walls being vertically movable between upper and lower positions to permit layers of bricks to be vertically deposited thereon.

39. Apparatus defined in claim 37 wherein said transfer station included a second platform connected to said first platform to be movable therewith alongside said path alignment with trays of said conveyor means.

40. Apparatus defined in claim 37 for handling multi-layers of bricks and wherein said layer of bricks is included in a group of said multilayered bricks conveyed over said path in said trays, said trays having opposite side walls of sufficient height to contain said group of multilayered bricks, and wherein there is further included, second means for removing from said group of bricks an upper layer to expose said first defined layer for permitting said first means to remove said row of bricks therefrom to form said voids.

41. Apparatus defined in claim 40 wherein said first means is positioned at a first station along said path and wherein there is further included means for moving said second means over said path to a second station downpath of said first station for restoring said upper layer of bricks on said first defined layer of bricks after said voids have been formed in said first defined layer of bricks.

42. Apparatus for forming voids in a layer of a multilayered stack of bricks including upper and lower layers of bricks with the upper layer of bricks resting on the lower layer of bricks; the apparatus comprising in combination; first brick gripping means for gripping said upper layer of bricks and moving same away from said lower layer of bricks, and second brick gripping means for gripping a predetermined number of bricks in said lower layer of bricks, and removing the same from said lower layer of bricks to form voids in said lower layer of bricks at predetermined locations in said lower layer, and wherein said first and second brick gripping means are mounted for movement in a vertical path and wherein said first brick gripping means is also movable in a horizontal plane for depositing said upper layer on said lower layer after the voids are formed in the lower layer, at a station spaced from the location where the voids are formed in said lower layer, and wherein there is further included first and second actuating means for respectively actuating said first and second brick gripping means independently of each other.

43. Apparatus defined in claim 42 wherein said second brick gripping means is also movable in a horizontal plane for moving the removed bricks to a storage area.

44. Apparatus intermittently defined in claim 42 further including conveyor means for intermittently moving said multilayered stack of bricks along a horizontal path, said first and second brick gripping means being positioned along said path to form voids in said stack during a phase in its conveyance along said horizontal path.

45. Apparatus for automatically forming voids in the lower layer of a double layer course of articles, each article having a predetermined length and width, proceeding along an index conveyor, said apparatus including:

a frame having frame moving means associated therewith for moving said frame from a position removed from said double layer course to a gripping position overlying said double layer course;

a first set of gripper members depending from said frame and engageable with the articles in the upper layer of said course;

a second set of gripper members engageable with opposite ends of some selected articles only in the lower layer of said course;

said first and second sets of grippers being operable independently of each other.

46. The apparatus according to claim 45 wherein said first set of gripper members depend from opposite sides of said carriage and apply sufficient pressure on the ends of said articles to lift the entire upper layer.

47. The apparatus according to claim 46 wherein said second set of gripper members is separate from said first set and operated by a separage activating means.

48. A method of forming the tyne layer in a stack of articles formed of a plurality of courses of said articles comprising the steps of:
   a. forming double layer courses of articles on a conveyor carrying the articles to a stacking machine;
   b. in predetermined courses, lifting the entire upper layer and selected articles in the lower layer, said selected articles in the lower layer being those to be removed to form tyne openings in said lower layer;
   c. depositing said selected articles from said lower layer on an auxiliary surface;
   d. placing a separator sheet on the remaining bricks in said lower layer; and
   e. replacing said upper layer on said separator sheet atop said lower layer.

* * * * *

UNITED STATES PATENT AND TRADEMARK OFFICE
CERTIFICATE OF CORRECTION

PATENT NO. : 4,182,442
DATED : January 8, 1980
INVENTOR(S) : ROBERT E. JONES

It is certified that error appears in the above-identified patent and that said Letters Patent are hereby corrected as shown below:

Column 19, line 16, "of" should be -- for --.

Column 20, line 4, "included" should read -- includes --;

line 10, "included" should read -- includes --.

Signed and Sealed this

Third Day of June 1980

[SEAL]

Attest:

SIDNEY A. DIAMOND

Attesting Officer        Commissioner of Patents and Trademarks